United States Patent
Kralik et al.

(10) Patent No.: US 7,904,276 B1
(45) Date of Patent: Mar. 8, 2011

(54) METHOD AND BUSINESS PROCESS FOR THE ESTIMATION OF EROSION COSTS IN ASSEMBLE-TO-ORDER MANUFACTURING OPERATIONS

(75) Inventors: Balazs Kralik, Berkeley, CA (US); Michael Goldbach, Berkeley, CA (US); Paul Dagum, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 265 days.

(21) Appl. No.: 12/057,515

(22) Filed: Mar. 28, 2008

Related U.S. Application Data

(63) Continuation of application No. 09/887,539, filed on Jun. 21, 2001, now Pat. No. 7,356,440.

(60) Provisional application No. 60/229,611, filed on Aug. 31, 2000, provisional application No. 60/213,189, filed on Jun. 21, 2000.

(51) Int. Cl.
G06F 11/30 (2006.01)

(52) U.S. Cl. .................. 702/182; 700/108; 705/10

(58) Field of Classification Search .................. 700/108; 702/182, 184; 705/1, 7–10, 28
See application file for complete search history.

(56) References Cited

U.S. PATENT DOCUMENTS

| | | | |
|---|---|---|---|
| 5,515,269 A | 5/1996 | Willis et al. | 364/401 |
| 5,630,070 A | 5/1997 | Dietrich et al. | 395/208 |
| 5,930,762 A | 7/1999 | Masch | 705/7 |
| 5,953,707 A | 9/1999 | Huang et al. | 705/10 |
| 6,006,192 A | 12/1999 | Cheng et al. | 705/7 |
| 6,151,582 A | 11/2000 | Huang et al. | 705/8 |
| 6,226,561 B1 | 5/2001 | Tamaki et al. | |
| 6,324,527 B1 | 11/2001 | Bajuk et al. | 705/400 |
| 6,434,440 B1 | 8/2002 | Teranishi et al. | |
| 6,453,303 B1 | 9/2002 | Li | 705/36 |
| 6,684,117 B2 | 1/2004 | Bacin et al. | |
| 6,684,193 B1 | 1/2004 | Chavez et al. | |
| 6,772,136 B2 | 8/2004 | Kant et al. | 706/50 |
| 6,947,903 B1 | 9/2005 | Perry | 705/28 |
| 6,957,186 B1 | 10/2005 | Guheen et al. | |
| 6,970,829 B1 | 11/2005 | Leamon | |
| 7,035,808 B1 | 4/2006 | Ford | |
| 7,039,595 B1 | 5/2006 | Lilly et al. | |

(Continued)

OTHER PUBLICATIONS

Bass, Frank M., Purdue University, *A New Product Growth For Model Consumer Durables*, Management Science, vol. 15, No. 5, Jan. 1969, pp. 215-227.

(Continued)

*Primary Examiner* — Andrew Joseph Rudy
(74) *Attorney, Agent, or Firm* — Perkins Coie LLP

(57) ABSTRACT

A method for forecasting the component surpluses for a target planning period is provided. To begin this method, a planner first identifies each component required to produce a product. For each component, the planner defines a planned level and an uncancelable level. The planned level for a component is the quantity at which the component is expected to be available. The uncancelable level for a component is the quantity of the component that cannot be liquidated without charge. The planner also defines a vector of connect rates for the components. After the required data has been entered, an expected surplus is computed for each component. To compute a component's expected surplus, the component is assumed to be available at its uncancelable level. The remainder of the components are assumed to be available at their respective planned levels. The mean production for the component is computed and used, along with the uncancelable level the selected component and the vector of connect rates to compute the component's expected surplus. This computation is repeated for all components in turn.

16 Claims, 3 Drawing Sheets

U.S. PATENT DOCUMENTS

| | | |
|---|---|---|
| 7,249,049 B1 | 7/2007 | Dagum et al. |
| 7,356,440 B1 | 4/2008 | Kralik et al. |
| 7,440,907 B2 | 10/2008 | Lilly et al. |
| 7,584,112 B1 | 9/2009 | Dagum et al. |

OTHER PUBLICATIONS

Dagum, Camilo, Econometric Research Program Princeton University, *Structural Permanence: Its Role in the Analysis of Structural Dualisms and Dependences and for Prediction and Decision Purposes*, The Economics of Structural Change vol. 1, The International Library of Critical Writings in Economics, An Elgar Reference Collection, 1969, pp. 211-235.

Mahajan, Vijay, Muller, Eitan and Bass, Frank M., *New-Product Diffusion Models*, Chapter 8, Handbooks in OR & MS, vol. 5, J. Eliashberg and G.L. Lilien, Eds., 1993, pp. 349-408.

Hanssens, Dominique M. and Leonard, J. Parsons, *Econometric and Time-Series Market Response Models*, Chapter 9, Handbooks in OR & MS, vol. 5, J. Eliashberg and G.L. Lilien, Eds., 1993, pp. 409-464.

Balazs Kralik et al., "Erosion, Cancellation and Expediting under Distributed Production," Rapt Technologies Corporation Technical Report TR-15-00, Feb. 1, 2000, Cover Sheet and pp. 1-9.

Paul Dagum, "Asset Risk Management," Rapt Technologies Corporation Technical Report TR-03-99, Feb. 1999, pp. 1-7.

Paul Dagum et al., "Demand Statistical Arbitrage with Variants of the Uniform Production Policy," Rapt Technologies Corporation Technical Report TR-14-00, Jan. 2000, Cover Sheet and pp. 1-13.

U.S. Appl. No. 12/043,632, filed Mar. 6, 2008, Kralik et al.

U.S. Appl. No. 12/060,252, filed Mar. 31, 2008, Chavez et al.

METHOD AND BUSINESS PROCESS FOR THE ESTIMATION OF EROSION COSTS IN ASSEMBLE-TO-ORDER MANUFACTURING OPERATIONS

RELATED APPLICATIONS

This application is a continuation of U.S. patent application Ser. No. 09/887,539, entitled "Method and Business Process for the Estimation of Erosion Costs in Assemble-to-Order Manufacturing Operations," filed Jun. 21, 2001, and naming Balazs Kralik, Michael Goldbach, and Paul Dagum as inventors, now U.S. Pat. No. 7,356,440 issued Apr. 8, 2008, which claims the benefit of U.S. Provisional Application No. 60/229,611, entitled "Method and Business Process for Estimation of Erosion Costs in Assemble-to-Order Manufacturing Operations," filed Aug. 31, 2000, and naming Balazs Kralik, Michael Goldbach, and Paul Dagum as inventors, which is related to U.S. Provisional Application No. 60/213,189, entitled "Method and Apparatus for the Estimation of Mean Production for Assemble-to-Order Manufacturing Operations," filed Jun. 21, 2000, and naming Paul Dagum, Michael Goldbach, and Balazs Kralik as inventors. This application is also related to U.S. Pat. No. 6,684,193, entitled "Method and Apparatus for Multivariate Allocation of Resources," issued on Jan. 27, 2004, and naming Thomas Chavez and Paul Dagum as inventors, and to U.S. patent application Ser. No. 09/491,461, entitled "Method and Apparatus for Optimizing a Multivariate Allocation of Resources," filed on Jan. 26, 2000, and naming Thomas Chavez and Paul Dagum as inventors, now U.S. Pat. No. 7,584,112 issued Sep. 1, 2009, and to U.S. Pat. No. 7,249,049, entitled "Method and Business Process for the Estimation of Mean Production for Assemble-to-Order Manufacturing Operations," issued on Jul. 24, 2007, and naming Paul Dagum, Michael Goldbach, and Balazs Kralik as inventors. These applications are incorporated by reference herein, in their entirety and for all purposes.

TECHNICAL FIELD OF THE INVENTION

The present invention is generally related to resource-planning methods used by manufacturing companies and other organizations. More specifically, it relates to risk management in the procurement of unfinished goods by estimation of expected excess component inventory and erosion costs.

BACKGROUND OF THE INVENTION

In the field of product manufacturing, the term assemble-to-order (ATO) refers to systems where products are not produced until the demand for the products becomes known. Manufacture-to-stock (MTS) systems, on the other hand, base production on component availability. Unlike ATO manufacturing, MTS systems often produce products before the demand for those products has been determined.

Manufacturing companies typically prefer to use ATO manufacturing operations whenever possible. ATO allows manufacturers to minimize their component inventories. This reduces the amount of capital invested in components and reduces the risk that components will loose value or become obsolete before they are transformed and sold as products.

In an ATO operation, the availability of components is the key variable that controls the ability to produce. If component availability is limited (either because inventory is limited or because supplier commitments to ship the component on demand are insufficient) then fulfillment of demand either fails or is delayed. On the other hand, if excess inventory is left over, it must be liquidated or utilized later. Both outcomes are costly to the company. If the company liquidates, it may be forced to do so at substantially reduced prices. Many items lose value because of innovation. This is especially true in the especially in the fast moving high-tech sector where goods, such as microprocessor are continually superseded with cheaper more powerful replacements. In other industries there are shelf life considerations that make it costly to try to utilize excess inventory at a later time. In both cases there is capital tied up in extra inventory and that corresponds to incurring a cost equivalent to the firms funding rate.

The cost incurred for component inventory that exceeds the inventory required to meet demand is referred to as the erosion cost. The estimation of erosion costs is paramount in making intelligent business decisions about the proper amount of components to obtain commitments in any given period. This is particularly true when a large number of products are made from a large number of the same components.

SUMMARY OF THE INVENTION

An embodiment of the present invention includes a method for the computation of surplus components. For this method, a planner first identifies each component required to produce a product. For each component, the planner defines a planned level and an uncancelable level. The planned level for a component is the quantity at which the component is expected to be available. The uncancelable level for a component is the quantity of the component that cannot be liquidated without charge. The planner also defines a vector of connect rates for the components.

After the required data has been entered, an expected surplus is computed for each component. To compute a component's expected surplus, the component is assumed to be available at its uncancelable level. The remainder of the components are assumed to be available at their respective planned levels. The mean production for the component is computed and used, along with the uncancelable level the selected component and the vector of connect rates to compute the component's expected surplus. This computation is repeated for all components in turn.

The expected component surpluses can then be used to compute the expected erosion cost per component and the total erosion cost for all components.

An assemble-to-order (ATO) manufacturing process is one in which products are manufactured from raw components only as orders are received. While ATO processes are more efficient than manufacture-to-stock (MTS) operations, in which products are produced before demand is known, they are not without significant risks. If component availability is below what is required to meet product demand, then fulfillment of orders is either delayed or fails. Conversely, if excess component inventory remains after demand is met, the excess is either returned to the supplier, usually at a loss, or held until future need. Thus any component inventory that does not exactly meet demand incurs some financial loss for the manufacturer. Being able to predict the excess component inventory and associated financial loss allows a manufacturer to make more informed business decisions.

The present invention addresses this need by providing a novel method for estimating component surplus and expected erosion costs. The erosion cost is simply the cost incurred for component inventory that exceeds the inventory required to meet demand. Estimation of erosion cost is particularly complicated when a large number of products are made from a large number of the same components, and thus the present invention is particularly advantageous under such conditions.

In addition to a business process and computer-implemented method, the present invention provides a system for computing expected component surplus and erosion costs. The system is preferably a computer system containing a memory, input/output devices, and processing means for implementing the method.

The present invention also provides a computer-readable medium of instructions executable by the computer to perform method steps for the method described above. The present invention applies equally regardless of the particular type of signal bearing media used. Examples of computer-readable media include: recordable-type media such as floppy disks and CD-ROMs and transmission-type media such as digital and analog communications links. It will be clear to one skilled in the art that the above embodiment may be altered in many ways without departing form the scope of the invention.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

The preferred embodiments of the present invention and their advantages are best understood by referring to FIGS. 1 through 4 of the drawings. Like numerals are used for like and corresponding parts of the various drawings.

Definitions

Component plan: a list of quantities for each component, representing a company's component order for a given planning period.

Scenario: a set of assumptions about products and components. A scenario includes product parameters, component parameters, component consumption, component interactions, and an allocation policy.

Overview of the Invention

Problem Definition

When possible, it is beneficial for manufacturing companies to produce their outputs in an assemble-to-order (ATO) fashion. While manufacture-to-stock (MTS) manufacturers produce outputs before demand for them is revealed, ATO operations only produce outputs as the order stream arrives.

In an ATO operation, the availability of components is the key variable that controls the ability to produce. If component availability is limited (either because inventory is limited or because supplier commitments to ship the component on demand are insufficient), then fulfillment of demand either fails or is delayed.

On the other hand if excess inventory is left over, it must be liquidated or utilized later. Both outcomes are costly to the company. If the company liquidates, it can only do so at substantially reduced prices. Many items especially in the fast-moving high-tech sector lose value because of innovation (e.g. who wants last year's microprocessor when this year's is twice as fast for the same price). In other industries there are simple shelf life considerations that make it costly to try to utilize excess inventory at a later time. In addition, in both cases there is capital tied up in the extra inventory and that corresponds to incurring a cost equivalent to the firms funding rate.

The estimation of the erosion costs is paramount in making intelligent business decisions about the proper amount of components to obtain commitments for in any given period.

Examples Problems Addressed by the Present Invention:

1. How to compute the expected component surplus at the end of a particular planning period 2. How to compute the value of expected erosion costs for a particular set of components in a planning period 3. Computation of the total expected erosion costs in a company for a particular planning period The essence of this invention is the ability to solve the above problems in cases where there is a plurality of products and components.

Environment

Figure 1:
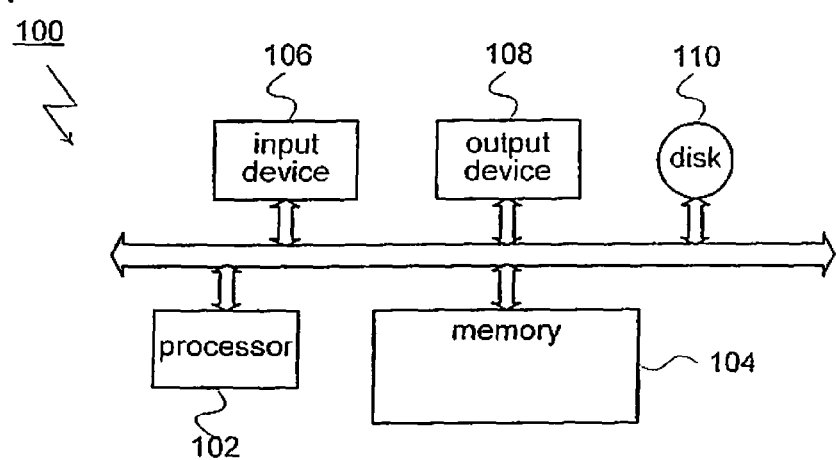
FIG. 1 is a block diagram of a computer system shown as a representative environment for deployment of the present invention.

In FIG. 1, a computer system 100 is shown as a representative environment for an embodiment of the present invention. Structurally, computer system 100 includes a processor, or processors 102, and a memory 104. Processor 102 can be selected from a wide range of commercially available or custom types. An input device 106 and an output device 108 are connected to processor 102 and memory 104. Input device 106 and output device 108 represent all types of I/O devices such as disk drives, keyboards, modems, network adapters, printers and displays. Computer system 100 may also includes a disk drive 110 of any suitable disk drive type (equivalently, disk drive 110 may be any non-volatile mass storage system such as "flash" memory).

Computing Expected Surplus

Figure 2:
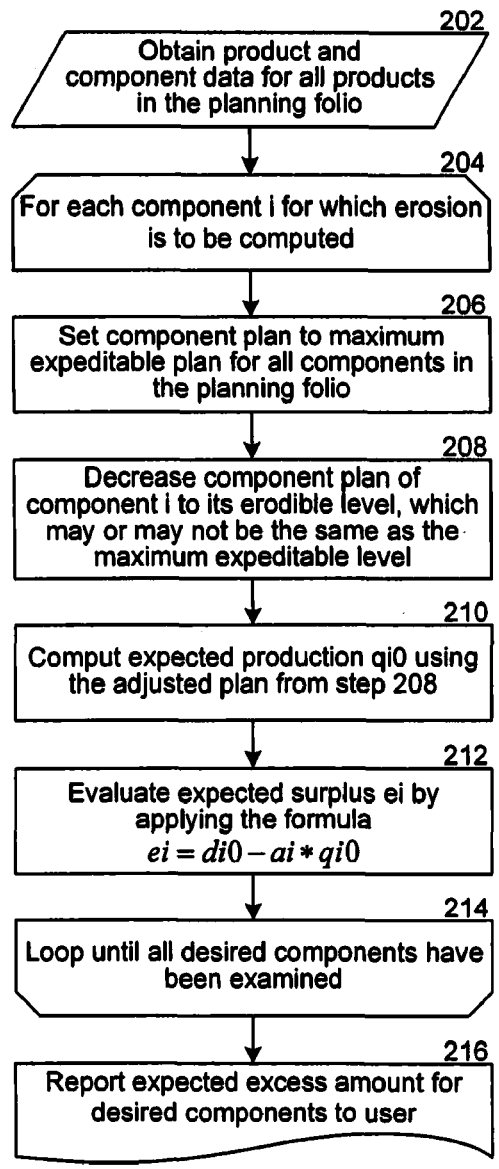
FIG. 2 is a flowchart showing the steps associated with an embodiment of the method for computing expected surplus of the present invention.

As shown in FIG. 2, an embodiment of the present invention includes a Method 200 for the computation of surplus components (expected excess number of components remaining at the end of a period). Method 200 consists of the following steps:

In step 202 a user enters data describing one or more products and their associated components. The data entered includes all the data required for mean production computation as disclosed in the related application "Method and Business Process for the Estimation of Mean Production for Assemble-To-Order Manufacturing Operations." In particular, this includes, for each product, information describing:

1) The type of components required to produce the product,

2) The number of each component required (A),

3) Component allocations (d),
4) The mean demand for the product ($\mu$),
5) The standard deviation of the demand for the product,
6) The correlations between the product and any other product.

This information can be input manually by the user or retrieved from a user database or other source.

For each component i, the value $d_i$ (referred to above as component allocations) represents the maximum number of that is available (i.e. the expeditable amounts specified for the mean production computations). In many cases, positioned components may be returning or canceled. In these cases, only the uncancelable portion is subject to erosion. As part of step 202, the user enters (or otherwise inputs) a value $d_i^o$ to represent the uncancelable portion of each component of interest. For each component i, the quantity $d_i - d_i^o$ represents the number that can be liquidated or returned at no cost. For some components, return or liquidation of any amount has an associated cost. For each component i, of this type the value $d_i$ is equal to $d_i$.

Steps 204 through 214 form a loop. This loop sequences each component i for which the calculation of surplus components is desired.

In step 206, each component plan $d_i$ is set to its original value. This means that each component is assumed to be available in its planned quantity.

In step 208 the component plan for component i (i.e., $d_i$) is set to $d_i^o$. This means that component i is assumed to be available at the uncancelable level for that component.

In step 210 the component levels specified in steps 206 and 208 (i.e., $d_i^o$ for component i and $d_i$ for all other components) are used to compute an expected mean production $q_i^o$ for a specified planning period. In general, there are several methods, such as Monte Carlo simulation that may be used to perform this computation. Preferably, but not necessarily, the method disclosed in the related application "Method and Business Process for the Estimation of Mean Production for Assemble-To-Order Manufacturing Operations."

In step 212 the formula $e_i = d_i^o - a_i \cdot q_i^o$ is used to compute the expected number of erodible components i. In this formula $d_i^o$ is the uncancelable level for component i, $a_i$ is the vector of connect rates for component i, and $q_i^o$ is the expected mean production computed in step 210.

In step 216 the expected excess is reported to the user or returned to the system for further use.

Computing Expected Erosion Costs Per Component

Figure 3:
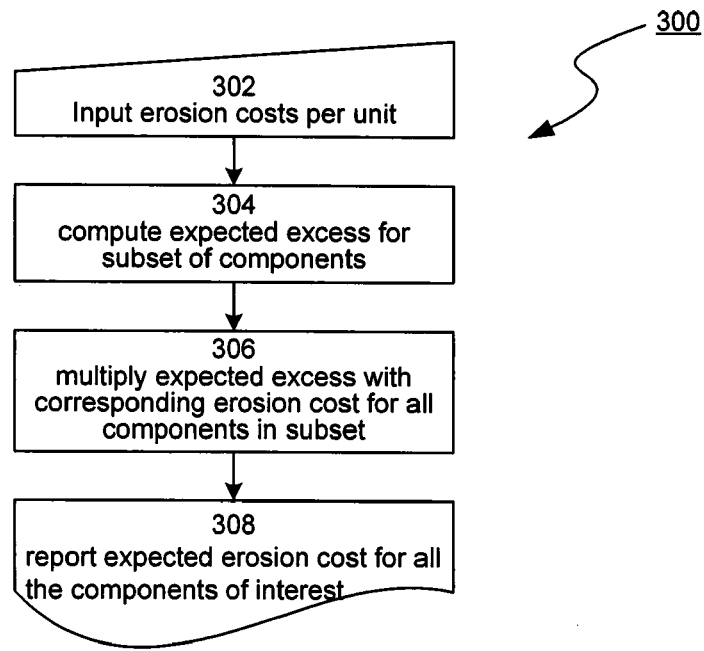
FIG. 3 is a flowchart showing the steps associated with an embodiment of the method for computing expected erosion costs per component of the present invention.

As shown in FIG. 3, an embodiment of the present invention includes a Method 300 for the computing the expected erosion costs per component (the expected financial cost of having leftover inventory for a subset of components). Method 300 consists of the following steps:

In step 302 a user inputs the erosion costs per surplus component.

In step 304 the expected surplus is evaluated using Method 200. This step may be done in parallel with step 302.

In step 306 the expected surplus is multiplied by the per-unit erosion costs to obtain the expected erosion cost for each component of interest.

In step 306 the expected erosion cost for each component of interest is reported to the user.

In step 308 we report the expected erosion cost for each component of interest.

Computing Total Expected Erosion Cost

Figure 4:
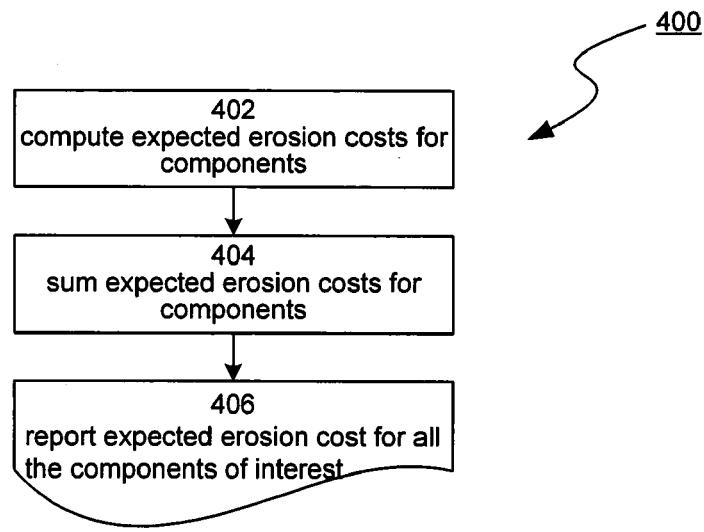
FIG. 4 is a flowchart showing the steps associated with an embodiment of the method for computing total expected erosion cost of the present invention.

As shown in FIG. 4, an embodiment of the present invention includes a Method 400 for computing the total expected erosion cost (i.e., estimating the total erosion cost a company should expect given a certain plan for component availability). Method 400 consists of the following steps:

In step 402 the component-by-component expected erosion costs are evaluated for all components of the planning portfolio. This step may be done in parallel.

In step 404 the numbers obtained in step 402 are summed.

In step 406 the single expected erosion cost number is reported back to the user, or stored for further processing by the system.

The method of computing erosion costs can be used as the basis for computing expected cancellation fees using the following equation:

$$C_i^{(l)} = E_i^{(l)} - E_i^{(l-1)}$$

The method of computing erosion costs can be used as the basis for computing expected expediting fees using the following equation:

$$X_i^{(l)} = (d_i^{(l)} - d_i^{(l-1)}) - (E_i^{(l)} - E_i^{(l-1)})$$

As will be appreciated, embodiments of the present this invention relate generally to the field of manufacturing resource planning. More specifically, the present invention relates to risk management in the procurement of unfinished goods.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

1 Review of Erosion Custom Assemble-to-Order Manufacturing

When component stock exceeds component consumption a surplus remains. When the producer does not have the option to return unused components, the surplus is subject to value erosion, in at least three ways:

opportunity cost of capital tied up in hard assets;
technical erosion due to design changes and technological progress; and
physical erosion due to spoilage.

As a result, the value of a surplus component is strictly less than its original value when it was purchased.

In some cases, the supply contract includes an option to return all or some of the component surplus subject to a cancellation fee. In the following analysis, we will assume that the cancellation fee is strictly less than the associated value erosion so that it will always be rational to exercise the cancellation option when it is available.

Similarly, a supply contract may also include an option to expedite extra components when component demand exceeds the stock. Again, expediting will carry with it an expediting fee which can be thought of as a premium for rush service. Just as there is a lower limit to how many components the supplier is willing to take back, there is also an upper limit beyond which components cannot be expedited at any cost. When demand exceeds component availability the company may charge itself a "penalty" for missed (or delayed) sales.

A model is introduced of erosion and expediting based on a simplifying assumption that a distribution on component demand could be induced from product demand without regard to production policies. In this report we relax that assumption, recognizing that component consumption is not driven by product demand directly, but rather by production.

2 Simple Erosion

In this section we consider the simple case of erosion when the supply contract does not allow for cancellation or expediting. As usual, we define product demand $x \in \mathfrak{R}^n$ as a random variable distributed normally with mean $\mu$ and covariance $\Sigma$. Given production $q \in \mathfrak{R}^n$ and connect rate matrix $A \in \mathfrak{R}^{m \times n}$, induced component consumption is $Aq$. We denote the available component stock by $d \in \mathfrak{R}^m$. Thus, the volume of component i subject to erosion is $$e_i = \max(d_i - [Aq]_i, 0) \equiv (d_i - [Aq]_i)^+. \quad (2.1)$$

Component supply d defines a feasible region $\Omega$, in which component supply is sufficient to meet demand. The feasible region $\Omega$ is a defined as a polyhedral set $$\Omega = \cap_{i \in \mathcal{M}} H_i. \quad (2.2)$$

where $\mathcal{M}$ denotes the set of relevant components, and $H_i$ denotes the halfspace where component supply d is sufficient to meet demand. i.e., $$H_i = \{x : d_i - [Ax]_i \geq 0\}. \quad (2.3)$$

In general, the feasible region can be product specific. In other words, the feasible region from the perspective of product j may be different that that of product k. We denote the feasible region with respect to product j as $\Omega(j)$, and the set of relevant components as $\mathcal{M}(j)$. In particular, under uniform allocation $\mathcal{M}(j)$ is the Markov Blanket associated with product j, where $$M(j) = \bigcup_{i=v} \quad (2.4)$$

Under prioritized allocation feasibility The production function $q : x \in \mathfrak{R}^n \to q \in \Omega$ establishes a level of feasible production given product demand x and component availability d. In principle, it is desirable to produce as much as is feasible, but never more than what is demanded.

Therefore, when demand is feasible production maps demand to itself. When demand is not feasible, production maps infeasible demand to the feasible frontier $$\partial \Omega = \Omega \cap (\cup_i \partial H_i) \quad (2.5)$$

where $\partial H_i = \{x : d_i - [Ax]_i = 0\}$. For clarity we will also denote the i-th row of A by $a_i$. Thus production is defined as follows $$q(x, d) = \begin{cases} x, & \text{if } x \in \Omega, \\ q \in \partial \Omega & \text{otherwise.} \end{cases} \quad (2.6)$$

Expected Erosion. Expected erosion is defined as $$\langle E_i \rangle = \int (d_i - [Aq]_i)^+ f(q) dq \quad (2.7)$$

Unfortunately, we do not have an explicit representation of the probability density function $f(q)$. However, it is useful to recognize that by the definition of production in (2.6), $q \in \Omega$, and therefore $d_i - [Aq(x,d)]_i \geq 0$ for all $i \in [m]$. Thus, expected erosion for component i can be computed as $$\langle E_i \rangle = \int (d_i - [Aq]_i)^+ f(q) dq \quad (2.8)$$
$$= \int (d_i - a_i \cdot q(x; d)) f(x; \mu, \Sigma) dx$$
$$= d_i - a_i \cdot \langle q \rangle.$$

In this simple case, computation of expected erosion, reduces to computation of expected production $\langle q \rangle$ Kralik and Dagum [2] present a method to compute expected production under the distributed production function $$q(x, d) = x - au, \text{ where} \quad (2.9)$$

$$a(x, d) = \max_i \left( \frac{d_i - a_i \cdot x}{a_i \cdot u}, 0 \right). \quad (2.10)$$

When $u=x$, this function satisfies the gate mapping property. Other values for u, i.e $u=\mu$, may not satisfy the gate mapping property over all $x \in \mathfrak{R}^n$, but may represent reasonable approximations.

3 Erosion Net of Cancellation

In some cases, the producer has the option to return or cancel positioned components. In this case, only the uncancellable portion of component surplus will be subject to erosion. We denote the uncancellable portion of available components by $d^{(o)}$. We continue to denote the full component availability as d and production $q \equiv q(x,d)$, but we introduce the following additional notation $$d_i^{(o)} \equiv [d_1 \, d_2 \, \ldots \, d_i^{(o)} \, \ldots \, d_m]$$

$$H_i^{(o)} \equiv \{x : d_i^{(o)} - [Ax]_i \geq 0\}$$

$$\Omega_i^{(o)} \equiv \Omega \cap H_i^{(o)}$$

$$q_i^{(o)} \equiv q(x, d_i^{(o)})$$

In view of the above notation, a more precise definition of erosion is given by $$E_i^{(o)} = (d_i^{(o)} - [Aq]_i)^+ \quad (3.1)$$

Taking the expectation of $E_i^{(o)}$ (3.1) presents a complication because production q is defined by the maximum component availability levels d, while erosion is computed with respect to the uncancellable levels $d_i^{(o)}$. Nevertheless, we will show that a simplification similar to (2.8) exists for a class of production functions which we refer to as gate mapping.

Gate Mapping Production. Given demand x, we define the gating component $i \in [m]$, to be the component for which the plan $d_i$ represents a binding constraint on production, i.e. production q falls on the $d_i$-face of the feasible region. In order to proceed, consider the function $$g_i(x, d) = a_i \cdot q(x, d) \quad (3.2)$$

$$= \begin{cases} a_i \cdot x & \text{if } x \in \Omega \\ d_i & \text{if } x \in \Omega \text{ and } i \text{ is gating} \\ \bar{g}_i(x, d) \leq d_i & \text{otherwise} \end{cases} \quad (3.3)$$

In the above definition, $\bar{g}_i$ is some function which depends on the problem details. Its region of definition $\Psi_i$ is the intersection of $\bar{\Omega}$ with the complement of the region where i is gating.

For the usual local-u production policy [2], $\bar{g}_i$ has an additional property: in its region of definition, it is independent of $d_i$. This is the gate mapping property:

Definition 3.1 Gate mapping property: an allocation policy is gate mapping if the following condition holds for every x: If for both $d=(d_1, \ldots, d_i, \ldots, d_n)$ and $d'=(d_1, \ldots, d'_i, \ldots, d_n)$ the gating component is the same $j \neq i$, then $q(x,d)=q(x,d')$.

Lemma 3.2 When production q is gate mapping as defined above, the production mappings q and $q_i^{(o)}$ are equivalent with respect to demand for which there is erosion associated with component i. In math: $q=q_i^{(o)}$ for all $x \in \{x : d_i^{(o)} - [Aq]_i > 0\}$.

Proof. There are two cases in which the condition $d_i^{(0)} > [Aq]_i$ holds:
1. $x \in \Omega_i^{(0)} \subset \Omega$, or
2. q maps $x \in \overline{\Omega}$ to the feasible frontier $\partial\Omega$ such that $q \in H_i^{(0)}$.

In the first case, $q = q_i^{(0)} = x$ because under the extra constraint $x \in H_i^{(0)}$ had no effect on feasibility. In the second case, there exists a component $k \neq i$ for which the feasibility constraint $x \in$ Hk is more constraining than the new constraint $x \in H_i^{(0)}$. Since production is gate mapping, infeasible demand is mapped to the part of the feasible frontier $\partial$Hk associated with the gating component k. Since the new constraint is not binding, it does not not change production mapping.

Lemma 3.3 If there is no erosion associated with demand x when it is mapped by a gate mapping function q, there is also no erosion in component i when production is mapped by $q_i^{(0)}$.

Proof. Let $\phi = \{x : d_i^{(0)} - a, q(x,d)]_i \leq 0\}$. Because production is gate mapping, q maps $x \in \phi$ to a point $q \notin H_i^{(0)}$. Therefore, when the feasible region is constrained to $\Omega_i^{(0)}$ by adding the constraint $q \in H_i^{(0)}$, component i becomes gating for all $x \in \phi$ and therefore $q_i^{(0)}$ will map that demand to the face of $\partial\Omega_i^{(0)}$ defined by the hyperplane $\partial H_i^{(0)} = \{q : d_i^{(0)} - [Aq]_i = 0\}$ along which there is no erosion.

Lemma 3.4 For all $x \in \mathfrak{R}^n \cdot d_i^{(0)} - [Aq]_i = d_i^{(0)} - [Aq_i^{(0)}]_i$.

Proof. The proof follows directly from Lemmas 3.2 and 3.3. From Lemma 3.2 we see that when there is erosion, the production mapping $q = q_i^{(0)}$. From Lemma 3.3 we see that when there is no erosion under q, the new mapping $q_i^{(0)}$ maps demand to the hyperplane $\partial H_i^{(0)}$ where there is no erosion We now state the following two propositions:

Proposition 3.1 When production is gate mapping property, expected erosion for component i can be computed as $$\langle E_i^{(0)} \rangle = d_i^{(0)} - a_i \cdot \langle q_i^{(0)} \rangle. \quad (3.4)$$

Proof. This proposition follows directly from Lemma 3.4 and Equation (2.8).

Proposition 3.2 The production function defined in (2.9) and (2.10) is gate mapping.

Proof. The max function in (2.10) ensures that demand is mapped back to hyperplane associated with the gating component.

Therefore we can compute (3.4) using available methods.

4 Cancellation

In the previous section we demonstrated how to compute the expected volume of erodible components. In this section we consider the expected volume of cancelled components. Cancelled components are the surplus components that can be returned to the supplier and therefore are not subject to erosion 4.1 Simple Cancellation As before, we denote the uncancellable volume of components by $d^{(0)}$. We now denote the component plan by $d^{(l)}$, where the component plan represents the amount of component positioned. Cancellation only applies to components that have been positioned. We continue to denote available components (which may include expediting) by d.

Given a production q such that $q \in H_i^{(l)}$, the number of components i that can be cancelled is $$C_i = d_i^{(l)} - \max(d_i^{(0)}, [A,q]_i). \quad (4.1)$$

The cancellation is otherwise 0.

Proposition 4.1 When production is gate mapping, expected cancellation can be computed from two erosion computations:

$$\langle C_i \rangle = \langle E_i^{(l)} \rangle - \langle E_i^{(0)} \rangle. \quad (4.2)$$

where $$\langle E_i^{(l)} \rangle = d_i^{(l)} - a_i \cdot \langle q_i^{(l)} \rangle.$$

Proof. Expanding the definition in (4.1), yields $$C_i = \begin{cases} d_i^{(1)} - [Aq]_i - (d_i^{(0)} - [Aq]_i), & \text{if } q \in H_i^{(0)}, \\ d_i^{(1)} - [Aq]_i & \text{if } d_i^{(0)} < [Aq]_i < d_i^{(1)}, \\ 0 & \text{otherwise.} \end{cases}$$

Taking the expected value of $\langle C_i \rangle$ over $x \in \mathfrak{R}^n$ implies that $$\langle C_i \rangle = \langle (d_i^{(l)} - [Aq]_i)^+ \rangle - \langle (d_i^{(0)} - [Aq]_i)^+ \rangle \quad (4.3)$$

We recognize the first term in (4.3) as simple erosion equivalent to $\langle E_i^{(l)} \rangle$. We recognize that the second term in (4.3) is equivalent to $\langle E_i^{(0)} \rangle$ following the discussion of erosion with cancellation in §3.

4.2 Multilevel Cancellation

In principle, there may be many levels of cancellation (or expediting). We denote a cancellation or expediting level by l, where $0 \leq l \leq L$, and the associated volumes of components by $d^{(l)}$, where $d_i^{(0)} < \ldots < d_i^{(l)} < \ldots d_i^{(L)}$. Thus $d = d^{(L)}$ represents components available for production. We can now expand the analysis to multiple levels of cancellation and introduce the following expanded notation:

$$d^{(l)} \equiv [d_1^{(l)} \ldots d_m^{(l)}],$$

$$H^{(l)} \equiv \{x : d_i^{(l)} - [Ax]_i \geq 0\},$$

$$\Omega^{(l)} \equiv \cap_{i \in [m]} H_i^{(l)}, \text{ and}$$

$$q^{(l)} \equiv q(x, d^{(l)}).$$

As before $$d \equiv d^{(L)},$$

$$H_i \equiv H_i^{(L)},$$

$$\Omega \equiv \Omega^{(L)}, \text{ and}$$

$$q \equiv q^{(L)}.$$

Following the reasoning in §4.1, expected cancellation of level $0 < l < L$ components is simply $$\langle C_i^{(l)} \rangle = \langle E_i^{(l)} \rangle - \langle E_i^{(l-1)} \rangle. \quad (4.4)$$

5 Expediting

Expediting is essentially the mirror problem to cancellation. However, instead of computing component surplus, we are computing component use. Thus while cancellation measured the nonnegative distance to an upper boundary, expediting measures then nonnegative distance to a lower boundary.

Let $d(^l)$ represent the components available at expediting level l. We now define expediting as associated with component i as $$X_i^{(1)} = \begin{cases} \min([Aq]_i, d_i^{(l)}) - d_i^{(l-1)}, & \text{if } q \in \overline{H}_i^{(l-1)} \\ 0, & \text{otherwise.} \end{cases} \quad (5.1)$$

Proposition 5.1 When production is gate mapping, expected expediting can be computed as $$\langle X_i^{(l)} \rangle = (d_i^{(l)} - d_i^{(l-1)}) - (\langle E_i^{(l)} \rangle - \langle E_i^{(l-1)} \rangle). \quad (5.2)$$

Proof. We follow the same logic as before. Expanding the definition in (5.1), yields $$X_i^{(l)} = \begin{cases} ([Aq]_i - d_i^{(l-1)}) - [Aq]_i - (d_i^{(l)}), & \text{if } q \in H_i^{(1)}, \\ [Aq]_i - d_i^{(l-1)}, & \text{if } d_i^{(l-1)} < [Aq]_i < d_i^{(l)}, \\ 0 & \text{otherwise.} \end{cases}$$

Taking the expected value of $X_i^{(l)}$ yields $$\langle X_i^{(l)} \rangle = \langle ([Aq]_i - d_i^{(l-1)})^+ \rangle - \langle ([Aq]_i - d_i^{(l)})^+ \rangle.$$

With a simple transformation we can recognize these as already known quantities:

$$\langle ([Aq]_i - d_i^{(l)})^+ \rangle = \langle [Aq]_i - d_i^{(l)} \rangle + \langle (d_i^{(l)} - [Aq]_i)^+ \rangle = a_i(q) - d_i^{(l)} + \langle E_i^{(l)} \rangle$$

With this, we can write $$\langle X_i^{(l)} \rangle = (d_i^{(l)} - d_i^{l-1}) - (\langle E_i^{(l)} \rangle - \langle E_i^{(l-1)} \rangle). \tag{5.3}$$

What is claimed is:

1. A computer implemented method:
estimating an expected component surplus, wherein said estimating comprises identifying a plurality of components required to produce a product;
defining a vector of connect rates for the components;
defining an uncancelable level for each of the components, each of the uncancelable levels defining a quantity of the each of the components below which the quantity of the each of the components cannot be liquidated without incurring a charge;
assuming that a selected one of the components is available at least at an uncancelable level of the uncancelable levels corresponding to the selected one of the components; and
computing the expected component surplus for the selected component using a mean production for the product, the uncancelable level and the vector of connect rates; and
calculating erosion cost for the component based on the calculated expected component surplus factoring in cancellation costs and expediting costs, wherein the computing is performed by a computer.

2. The computer implemented method of claim 1 wherein the mean production is estimated by calculating an estimated volume of the component subject to erosion based on a difference between the supply for the component and number of components needed to meet a demand for the product based on the connect rate for that component of the product and a probability density function.

3. The computer implemented method of claim 1 wherein the calculating of the expected component surplus is based on a probability density function representing demands for the product.

4. The computer implemented method of claim 1 wherein the mean production is based on a probability density function representing demands for the product.

5. The computer implemented method of claim 1 wherein the cancellation costs are multilevel.

6. A recordable-type, computer-readable medium containing instructions for controlling a computer to estimate erosion costs of components of products, by a method comprising:
for each of a plurality of products,
identifying components required to produce the product;
for each component of the product, identifying a connect rate for the component; and
providing a probability density function representing demands for the product; and
for each of the components of a product,
identifying a supply for the component; and
calculating by a computer an estimated volume of the component subject to erosion based on a difference between the supply for the component and number of components needed to meet the demand for the product based on the connect rate for that component of the product and the provided probability density function; and
calculating erosion cost for the component based on the calculated estimated erosion.

7. The recordable-type, computer-readable medium of claim 6 wherein the calculating of erosion cost for a component is further based on cancellation costs and expediting costs for the component.

8. The recordable-type, computer-readable medium of claim 6 wherein the estimated volume of erosion is based on an assumption that a selected one of the components is available at least at an uncancelable level.

9. The recordable-type, computer-readable medium of claim 6 wherein the estimated volume of erosion is based on an assumption that at least one of the components is a gating component.

10. The recordable-type, computer-readable medium of claim 6 wherein when meeting a demand for a product is not feasible, mapping the demand onto a feasible frontier.

11. The recordable-type, computer-readable medium of claim 6 wherein when meeting a demand for a product is feasible, mapping production to demand.

12. A computer for estimating erosion costs of components of products, comprising:
a memory storing computer-executable instructions for controlling the computer to:
for each of a plurality of products,
identify components required to produce the product;
for each component of the product, identify a connect rate for the component; and
provide a probability density function representing demands for the product;
for each of the components of a product,
identify a supply for the component;
calculate an estimated volume of the component subject to erosion based on a difference between the supply for the component and number of components needed to meet the demand for the product based on the connect rate for that component of the product and the provided probability density function; and
calculating estimated erosion costs for the components based on the calculated expected volume of erosion, cancellation costs, and expediting costs; and
a processor for executing the computer-executable instructions stored in the memory.

13. The computer of claim 12 wherein the estimated volume of erosion is based on an assumption that a selected one of the components is available at least at an uncancelable level.

14. The computer of claim 12 wherein the estimated volume of erosion is based on an assumption that at least one of the components is a gating component.

15. The computer of claim 12 wherein when meeting a demand for a product is not feasible, mapping the demand onto a feasible frontier.

16. The computer of claim 12 wherein when meeting a demand for a product is feasible, mapping production to demand.

* * * * *